United States Patent
Shen et al.

(10) Patent No.: US 10,264,556 B2
(45) Date of Patent: Apr. 16, 2019

(54) RESOURCE ELEMENT USAGE IN CONTROL CHANNEL ELEMENTS

(71) Applicant: LENOVO INNOVATIONS LIMITED (HONG KONG), Hong Kong (CN)

(72) Inventors: Zukang Shen, Beijing (CN); Wei Ling, Beijing (CN); Xinghua Song, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 86 days.

(21) Appl. No.: 15/463,417

(22) Filed: Mar. 20, 2017

(65) Prior Publication Data
US 2017/0280429 A1    Sep. 28, 2017

(30) Foreign Application Priority Data
Mar. 24, 2016   (WO) ................ PCT/CN2016/077209

(51) Int. Cl.
*H04W 72/04*   (2009.01)

(52) U.S. Cl.
CPC ... *H04W 72/0406* (2013.01); *H04W 72/0446* (2013.01)

(58) Field of Classification Search
CPC ................ H04W 72/0406; H04W 72/0446
See application file for complete search history.

(56) References Cited

U.S. PATENT DOCUMENTS

| | | | |
|---|---|---|---|
| 2013/0182664 A1* | 7/2013 | Chen | H04W 72/042 370/329 |
| 2013/0201923 A1 | 8/2013 | Ren | |
| 2018/0007574 A1* | 1/2018 | Park | H04B 7/04 |

FOREIGN PATENT DOCUMENTS

WO    2013114632 A1    8/2013

OTHER PUBLICATIONS

PCT/CN2016/077209, International Search Report and Written Opinion, dated Dec. 21, 2016, pp. 1-11.
Qualcomm Incorporated, "UCI content", 3GPP TSG-RAN WG1 #86 R1-1610179, Oct. 10-14, 2016, pp. 1-2.

* cited by examiner

*Primary Examiner* — Afshawn M Towfighi
(74) *Attorney, Agent, or Firm* — Kunzler, PC

(57) ABSTRACT

Apparatuses, methods, and systems are disclosed for efficient RE usage in CCEs. One apparatus includes a processor that determines a control channel frequency region including a set of CCEs in a TTI. Each CCE of the set of CCEs includes a set of REs. The processor determines a subset of CCEs of the set of CCEs not used for transmission of control information. The apparatus includes a receiver that receives data on the REs in the subset of CCEs.

32 Claims, 11 Drawing Sheets

RESOURCE ELEMENT USAGE IN CONTROL CHANNEL ELEMENTS

FIELD

The subject matter disclosed herein relates generally to wireless communications and more particularly relates to resource element ("RE") usage in control channel elements ("CCEs") in a wireless communication system.

BACKGROUND

The following abbreviations are herewith defined, at least some of which are referred to within the following description.
3GPP Third Generation Partnership Project
ACK Positive-Acknowledgment
ANDSF Access Network Discovery and Selection Function
AP Access Point
APN Access Point Name
AS Access Stratum
BLER Block Error Ratio
BPSK Binary Phase Shift Keying
CAZAC Constant Amplitude Zero Auto Correction
CCA Clear Channel Assessment
CCE Control Channel Element
CP Cyclic Prefix
CQI Channel Quality Information
CSI Channel State Information
CRS Cell-Specific Reference Signal
CSS Common Search Space
DCI Downlink Control Information
DL Downlink
DMRS Demodulation Reference Signal
EDGE Enhanced Data Rates for Global Evolution
eNB Evolved Node B
EPDCCH Enhanced Physical Downlink Control Channel
E-RAB E-UTRAN Radio Access Bearer
ETSI European Telecommunications Standards Institute
E-UTRAN Evolved Universal Terrestrial Radio Access Network
FBE Frame Based Equipment
FDD Frequency Division Duplex
FDMA Frequency Division Multiple Access
FEC Forward Error Correction
GERAN GSM/EDGE Radio Access Network
GPRS General Packet Radio Service
GSM Global System for Mobile Communication
GTP GPRS Tunneling Protocol
HARQ Hybrid Automatic Repeat Request
H-PLMN Home Public Land Mobile Network
IoT Internet-of-Things
IP Internet Protocol
ISRP Inter-System Routing Policy
LAA Licensed Assisted Access
LBE Load Based Equipment
LBT Listen-Before-Talk
LTE Long Term Evolution
MCL Minimum Coupling Loss
MCS Modulation and Coding Scheme
MME Mobility Management Entity
MU-MIMO Multi-User, Multiple-Input, Multiple-Output
NACK or NAK Negative-Acknowledgment
NAS Non-Access Stratum
NBIFOM Network-Based IP Flow Mobility
NB-IoT NarrowBand Internet of Things
OFDM Orthogonal Frequency Division Multiplexing
PCell Primary Cell
PBCH Physical Broadcast Channel
PCID Physical Cell Identification ("ID")
PCO Protocol Configuration Options
PCRF Policy and Charging Rules Function
PDCCH Physical Downlink Control Channel
PDCP Packet Data Convergence Protocol
PDN Packet Data Network
PDSCH Physical Downlink Shared Channel
PDU Protocol Data Unit
PGW Packet Data Network Gateway
PHICH Physical Hybrid ARQ Indicator Channel
PLMN Public Land Mobile Network
PRACH Physical Random Access Channel
PRB Physical Resource Block
PSS Primary Synchronization Signal
PUCCH Physical Uplink Control Channel
PUSCH Physical Uplink Shared Channel
QoS Quality of Service
QPSK Quadrature Phase Shift Keying
RAB Radio Access Bearer
RAN Radio Access Network
RAR Random Access Response
RE Resource Element
RRC Radio Resource Control
RS Reference Signal
RX Receive
s-PDCCH Shortened PDCCH
s-PDSCH Shortened PDSCH
s-TTI Shortened TTI
s-UE A UE Configured to Use s-TTI
SC-FDMA Single Carrier Frequency Division Multiple Access
SCell Secondary Cell
SCH Shared Channel
SGW Serving Gateway
SIB System Information Block
SINR Signal-to-Interference-Plus-Noise Ratio
SR Scheduling Request
SSS Secondary Synchronization Signal
TAU Tracking Area Update
TBS Transport Block Size
TCP Transmission Control Protocol
TDD Time-Division Duplex
TDM Time Division Multiplex
TED Tunnel Endpoint Identification ("ID")
TTI Transmit Time Interval
TX Transmit
UCI Uplink Control Information
UE User Entity/Equipment (Mobile Terminal)
UL Uplink
UMTS Universal Mobile Telecommunications System
V-PLMN Visited Public Land Mobile Network
WiMAX Worldwide Interoperability for Microwave Access
WLAN Wireless Local Area Network In wireless communications networks, a frame structure for LTE FDD may be used. A radio frame of 10 milliseconds ("ms") may include 10 subframes, each of which is 1 ms. Each subframe further may include two slots, each of which is 0.5 ms. Within each slot, a number of OFDM symbols may be transmitted. The transmitted signal in each slot on an antenna port may be described by a resource grid comprising $N_{RB}^{DL} N_{sc}^{RB}$ subcarriers and $N_{symb}^{DL}$ OFDM symbols, where $N_{RB}^{DL}$ is a number of RBs in the DL (which is dependent on the transmission bandwidth of a cell); $N_{sc}^{RB}$ is the number of subcarriers in each RB; and each subcarrier occupies a certain frequency of size Δf. The values of $N_{sc}^{RB}$, Δf, and $N_{symb}^{DL}$ may depend on a cyclic prefix as shown in Table 1.

TABLE 1

| Configuration | | $N_{sc}^{RB}$ | $N_{symb}^{DL}$ |
|---|---|---|---|
| Normal Cyclic Prefix | Δf = 15 kHz | 12 | 7 |
| Extended Cyclic Prefix | Δf = 15 kHz | | 6 |
| | Δf = 7.5 kHz | 24 | 3 |

In certain configurations, an antenna port may refer to a logical antenna port (i.e., it may not necessarily refer to a physical antenna or antenna element). Mapping between an antenna port and physical antenna element(s) may be implementation specific. In other words, different devices may have a different mapping of physical antenna element(s) to the same antenna port. A receiving device may assume that the signals transmitted on the same antenna port go through the same channel. Moreover, a receiving device cannot assume signals transmitted on different antenna ports go through the same channel.

In certain wireless communication networks, the transmission time interval ("TTI") may be 1 ms. In other wireless communication networks, such as networks using s-TTI, the s-TTI may be less than 1 ms. In such wireless communication networks, certain control channel elements ("CCEs") may be unused. Unused CCEs may waste available transmission bandwidth.

BRIEF SUMMARY

Apparatuses for efficient RE usage in CCEs are disclosed. Methods and systems also perform the functions of the apparatus. In one embodiment, the apparatus includes a processor that determines a control channel frequency region including a set of control channel elements ("CCEs") in a transmit time interval ("TTI"). Each CCE of the set of CCEs includes a set of resource elements ("REs"). The processor also determines a subset of CCEs of the set of CCEs not used for transmission of control information. In certain embodiments, the apparatus includes a transmitter that transmits data on the REs in the subset of CCEs.

In certain embodiments, the transmitter transmits control information indicating a data channel frequency region using CCEs in the set of CCEs. In some embodiments, the transmitter transmits a control channel occupancy indicator that indicates the subset of CCEs not used for transmission of control information. In one embodiment, the control channel occupancy indicator includes a one-bit indicator that indicates the subset of CCEs includes each CCE of the set of CCEs in which control information is not transmitted. In various embodiments, the subset of CCEs excludes CCEs outside of a data channel frequency region.

In some embodiments, the control channel occupancy indicator includes an N-bit indicator, and each bit of the N-bit indicator indicates whether a corresponding subset of CCEs of the set of CCEs is used for transmission of control information. In certain embodiments, the control channel occupancy indicator includes a one-bit indicator that indicates a second set of CCEs in the control channel frequency region not used for transmission of control information. The second set of CCEs may be in one or more TTIs that follow the TTI. In various embodiments, the control channel occupancy indicator includes an L-bit indicator, and each bit of the L-bit indicator indicates whether a corresponding set of CCEs in a set of K TTIs is used for transmission of control information. In some embodiments, the control channel occupancy indicator excludes CCEs of the set of CCEs on which control information is transmitted.

One method for efficient RE usage in CCEs includes determining a control channel frequency region including a set of CCEs in a TTI. Each CCE of the set of CCEs includes a set of REs. In certain embodiments, the method includes determining a subset of CCEs of the set of CCEs not used for transmission of control information. In various embodiments, the method includes transmitting data on the REs in the subset of CCEs.

Another apparatus for efficient RE usage in CCEs includes a processor that determines a control channel frequency region including a set of CCEs in a TTI. Each CCE of the set of CCEs includes a set of REs. In certain embodiments, the processor determines a subset of CCEs of the set of CCEs not used for transmission of control information. In various embodiments, the apparatus includes a receiver that receives data on the REs in the subset of CCEs.

In certain embodiments, the receiver receives control information indicating a data channel frequency region using CCEs in the set of CCEs. In some embodiments, the receiver receives a control channel occupancy indicator that indicates the subset of CCEs not used for transmission of control information. In one embodiment, the control channel occupancy indicator includes a one-bit indicator that indicates the subset of CCEs includes each CCE of the set of CCEs in which control information is not transmitted. In various embodiments, the subset of CCEs excludes CCEs outside of a data channel frequency region.

In some embodiments, the control channel occupancy indicator includes an N-bit indicator, and each bit of the N-bit indicator indicates whether a corresponding subset of CCEs of the set of CCEs is used for transmission of control information. In certain embodiments, the control channel occupancy indicator includes a one-bit indicator that indicates a second set of CCEs in the control channel frequency region not used for transmission of control information. The second set of CCEs may be in one or more TTIs that follow the TTI. In various embodiments, the control channel occupancy indicator includes an L-bit indicator, and each bit of the L-bit indicator indicates whether a corresponding set of CCEs in a set of K TTIs is used for transmission of control information. In some embodiments, the control channel occupancy indicator excludes CCEs of the set of CCEs on which control information is transmitted.

Another method for efficient RE usage in CCEs includes determining a control channel frequency region including a set of CCEs in a TTI. Each CCE of the set of CCEs includes a set of REs. In some embodiments, the method includes determining a subset of CCEs of the set of CCEs not used for transmission of control information. In certain embodiments, the method includes receiving data on the REs in the subset of CCEs.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered as limiting of scope, the embodiments will be described and explained with additional specificity and detail through the use of the accompanying drawings, in which.

DETAILED DESCRIPTION

Figure 1:
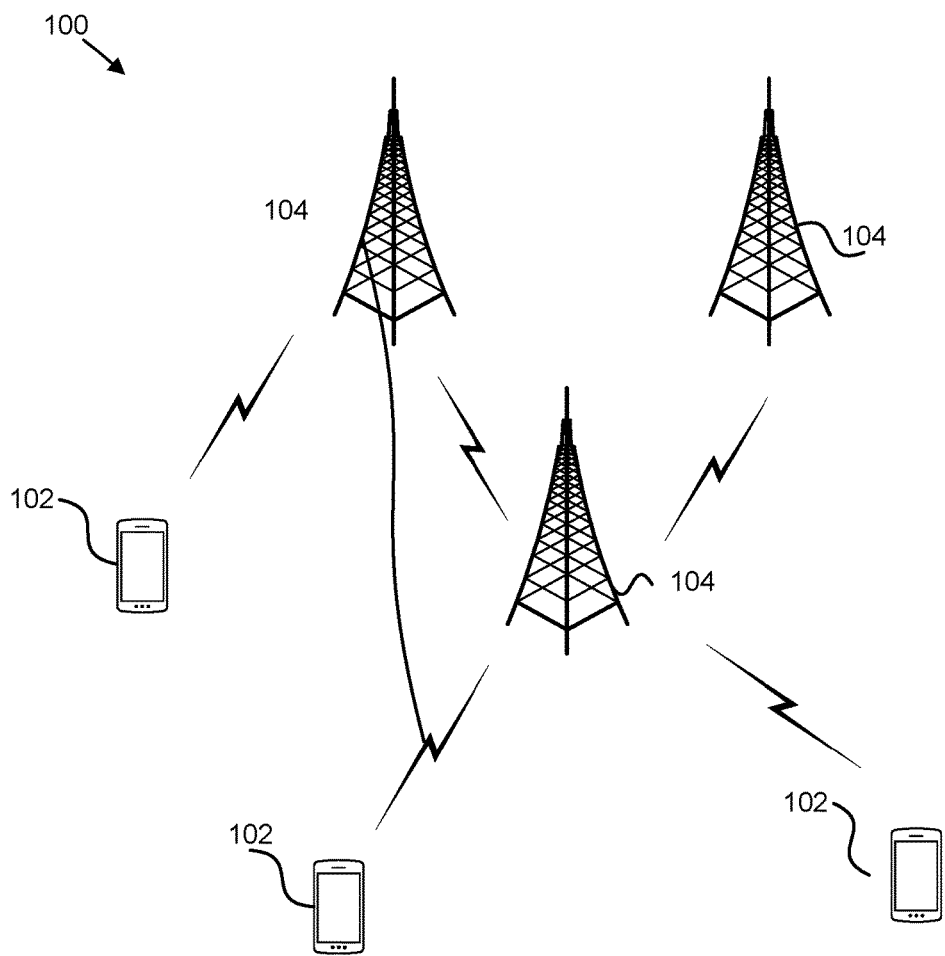
FIG. 1 is a schematic block diagram illustrating one embodiment of a wireless communication system for efficient RE usage in CCEs.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for efficient RE usage in CCEs. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), low throughput devices, low delay sensitivity devices, ultra-low cost devices, low power consumption devices, an IoT device, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that may include one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. For example, one or more base units 104 may be communicably coupled to an MME, an SGW, and/or a PGW.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. In another implementation, the wireless communication system 100 is compliant with NB-IoT. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, an apparatus (e.g., remote unit 102) may determine a control channel frequency region including a set of CCEs in a TTI. Each CCE of the set of CCEs may include a set of REs. The apparatus may also determine a subset of CCEs of the set of CCEs not used for transmission of control information. The apparatus may transmit data on the REs in the subset of CCEs. Therefore, REs in CCEs that may otherwise be unused may be used to carry data.

In a further embodiment, an apparatus (e.g., base unit 104) may determine a control channel frequency region including a set of CCEs in a TTI. Each CCE of the set of CCEs may include a set of REs. The apparatus may also determine a subset of CCEs of the set of CCEs not used for transmission of control information. The apparatus may receive data on the REs in the subset of CCEs.

Figure 2:
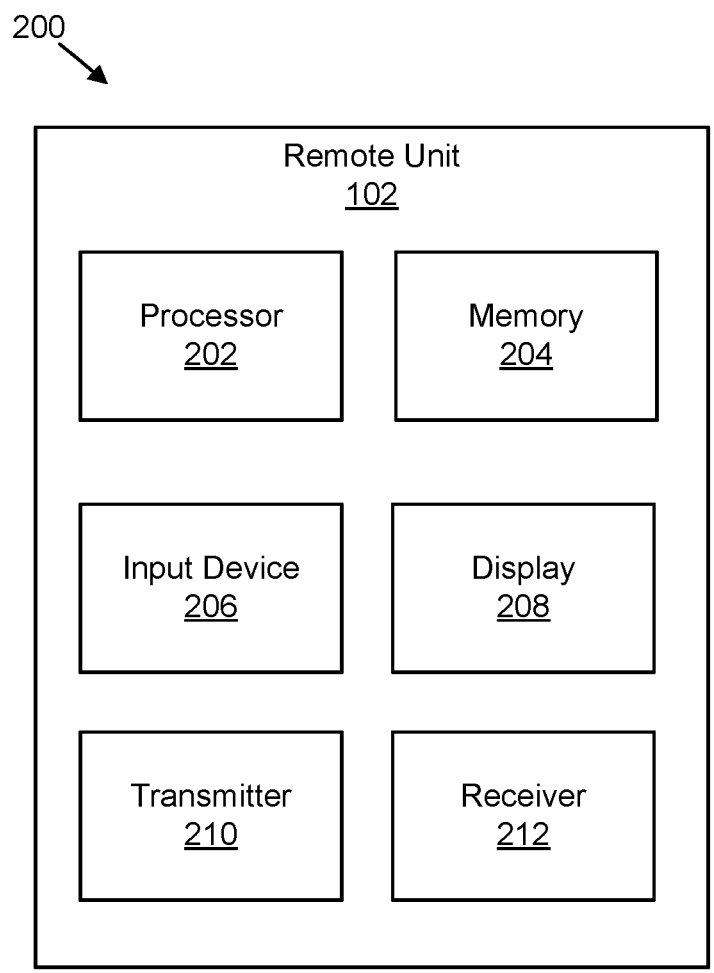
FIG. 2 is a schematic block diagram illustrating one embodiment of an apparatus that may be used for efficient RE usage in CCEs.

FIG. 2 depicts one embodiment of an apparatus 200 that may be used for efficient RE usage in CCEs. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine RE usage in CCEs being received.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 is used to receive data on REs in CCEs that would otherwise be unused. In one embodiment, the transmitter 210 is used to transmit feedback information and/or an indication to the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
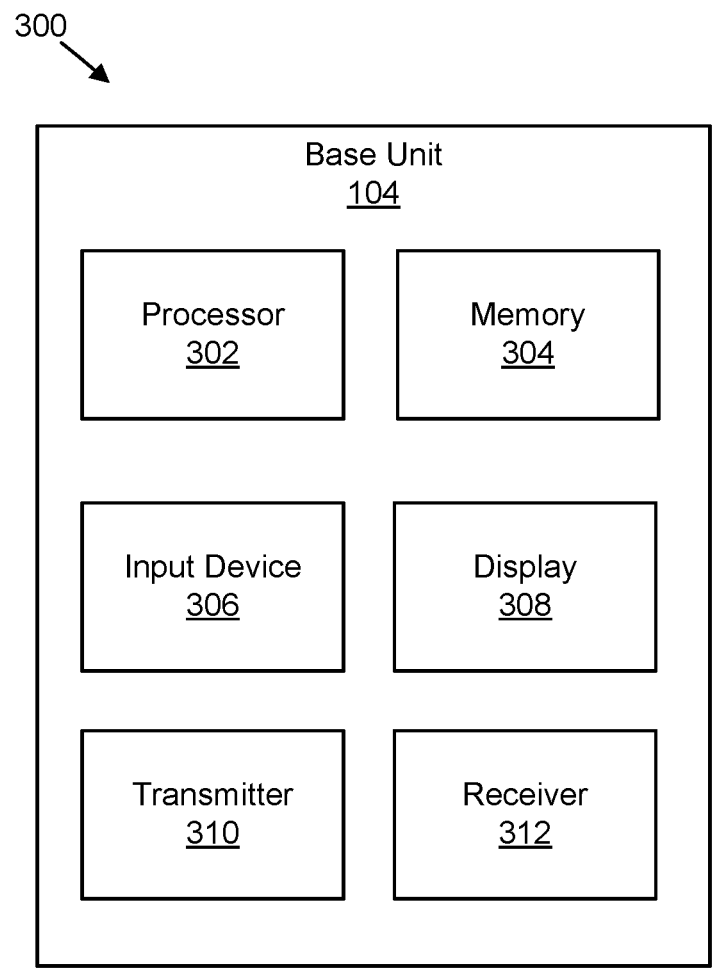
FIG. 3 is a schematic block diagram illustrating one embodiment of an apparatus that may be used for efficient RE usage in CCEs.

FIG. 3 depicts one embodiment of an apparatus 300 that may be used for efficient RE usage in CCEs. The apparatus 300 includes one embodiment of the base unit 104. Furthermore, the base unit 104 may include a processor 302, a memory 304, an input device 306, a display 308, a transmitter 310, and a receiver 312. It should be noted that the processor 302, the memory 304, the input device 306, and the display 308 may be substantially similar to the processor 202, the memory 204, the input device 206, and the display 208 of the remote unit 102, respectively. In certain embodiments, the processor 302 may be used to determine RE usage in CCEs being transmitted.

The transmitter 310 is used to provide DL communication signals to the remote unit 102 and the receiver 312 is used to receive UL communication signals from the remote unit 102. In certain embodiments, the transmitter 310 is used to transmit data on REs of CCEs that may otherwise be unused. It should be noted that, in certain embodiments, an MME, an SGW, and/or a PGW may include one or more components found in the base unit 104. Furthermore, in certain embodiments, the base unit 104 may represent one embodiment of an MME, an SWG or a PGW.

Figure 4:
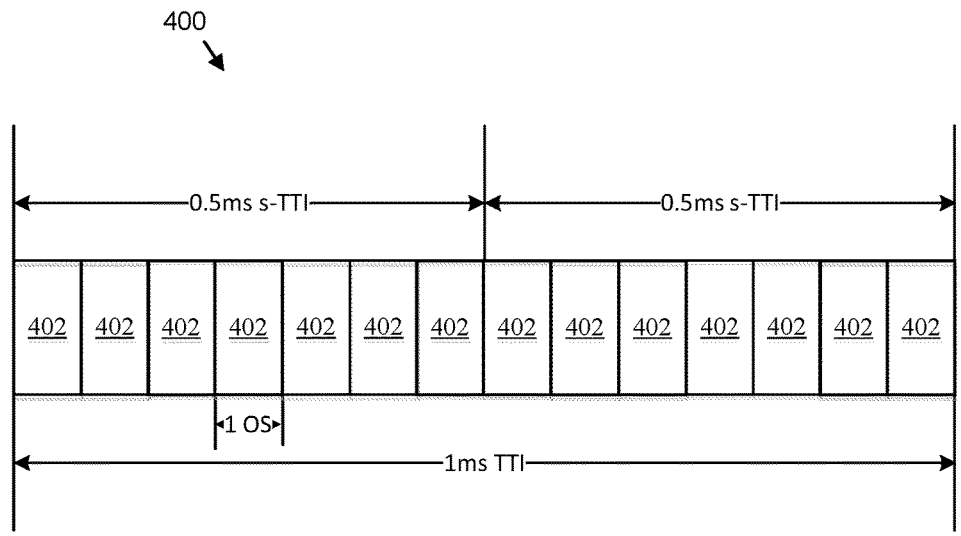
FIG. 4 illustrates one embodiment of s-TTIs.
Figure 5:
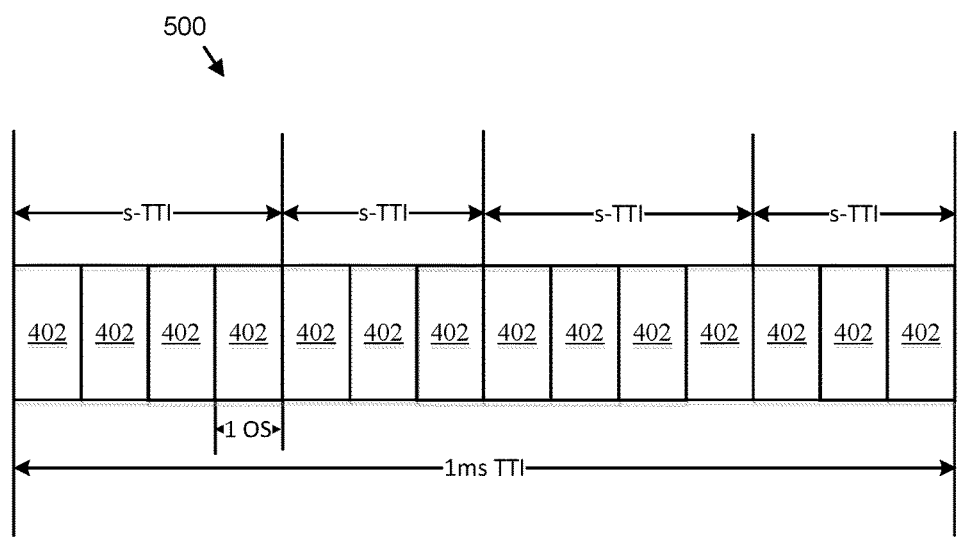
FIG. 5 illustrates another embodiment of s-TTIs.

FIG. 4 illustrates one embodiment of s-TTIs 400 using a normal cyclic prefix as an example. In the illustrated embodiment, each s-TTI is half the length of a standard size TTI of 1 ms. Accordingly, each s-TTI is 0.5 ms. As illustrated, each s-TTI includes seven OFDM symbols 402. FIG. 5 illustrates another embodiment of s-TTIs 500, again using a normal cyclic prefix as an example. In this embodiment, some s-TTIs include four OFDM symbols 402, and some s-TTIs include three OFDM symbols 402. It should be noted that an s-TTI may include any number of OFDM symbols 402 that is less than a standard size TTI. In this disclosure, a UE that is configured to use s-TTI may be referred to as an s-UE (e.g., remote unit 102), while a UE not configured to use s-TTI may be referred to as a legacy UE. In certain embodiments, the subcarrier spacing and the cyclic prefix length may be common to both legacy UEs and s-UEs.

In certain embodiments, in order to multiplex the s-UEs with legacy UEs in a system that maintains backward compatibility, FDM may be used. In such embodiments, s-UEs may be configured to use some of the system bandwidth. Because of the limited number of frequency resources that may be assigned to s-UEs, the scheduled number of s-UEs may be limited to one or two in one s-TTI.

In some embodiments, in order to reduce scheduling delay, every s-TTI may have its own s-PDCCH. s-PDCCH may be substantially similar to legacy PDCCH or EPDCCH (i.e., an s-PDCCH may be transmitted using an aggregation of one or several logical control channel elements ("CCEs")). The frequency-time resources of s-PDCCH may be predefined or configured by RRC signaling and the RE mapping for logical s-PDCCH CCE may be defined according to a predefined pattern. The search space for s-PDCCH may also be defined as a set of s-PDCCH candidates that occupy one or several CCEs.

In various embodiments, only one or two s-UEs are scheduled in an s-TTI, considering the limited resources assigned for an s-TTI. Thus, there is a possibility that s-PDCCH carrying UL grant(s) and DL assignment(s) may not occupy all the CCEs within one s-TTI. The REs which are occupied by those unused CCEs may be used as described herein.

For example, an occupation indication may be made of the REs which are occupied by the unused CCEs in the search space of s-PDCCH of s-TTI that may be used by the s-PDSCH of s-UE. By using the otherwise unused CCEs, the overhead of s-PDCCH may be reduced and the available REs for the corresponding s-PDSCH transmission of s-TTI may be increased.

In one embodiment, a bit field in the downlink control information ("DCI") carried by s-PDCCH may be used to indicate which CCEs are unused by s-PDCCH. In certain embodiments, the bit field may be used to indicate the CCE occupation of s-PDCCH (e.g., which CCEs are used by s-PDCCH). In some embodiments, at an eNB (e.g., base unit 104), unoccupied CCEs may be used for scheduled s-PDSCH and the s-PDCCH CCE occupation indication may be signaled to a UE in the DCI. In such embodiments, at the UE, by reading the s-PDCCH CCE occupation indication in the DCI, rate matching for s-PDSCH may be performed.

The bit field may be defined in several different ways that vary based on a number of bits in the bit field and a number of scheduled s-PDSCH to which the bit field corresponds. The following are the brief summaries of various embodiments that will be described in greater detail in FIGS. 6 through 10.

In one embodiment, a single s-PDCCH is used to schedule one s-PDSCH in one s-TTI. In this embodiment, the bit field includes one bit. The bit field may be used to indicate whether all the remaining CCEs within a scheduled s-PDSCH frequency region (except the CCEs occupied by s-PDCCH carrying DL assignment and s-PDCCH carrying UL grant) are occupied. The s-PDSCH frequency region may be one example of a data channel frequency region. In certain embodiments, the bit field may be used to indicate whether all the remaining CCEs regardless of the scheduled s-PDSCH frequency region (except the CCEs occupied by s-PDCCH carrying DL assignment and s-PDCCH carrying UL grant) are occupied. In some embodiments, the CCEs may be transmitted in a control channel frequency region, of which an s-PDCCH frequency region is one example. In this embodiment the bit field is used to indicate the occupied status of s-PDCCH CCEs in the same s-TTI.

In another embodiment, a single s-PDCCH is used to schedule multiple s-PDSCHs in K (where K>=1) s-TTIs. In this embodiment, the bit field includes N bits where N>1 (e.g., an N bit indicator). The total number of logical s-PDCCH CCEs in an s-TTI is assumed to be M. Accordingly, the M (M>=N) s-PDCCH CCEs may be divided into N sets, and each bit in the bit field indicates whether CCEs in each CCE set of N sets are occupied (or whether CCEs in each CCE set of N sets are not occupied) in each of the K s-TTIs (excluding an s-TTI in which legacy PDCCH is used to schedule s-PDSCH).

In a further embodiment, a single s-PDCCH is used to schedule multiple s-PDSCHs in K (where K>1) s-TTIs. In this embodiment, the bit field includes one bit. In certain embodiments, the bit field may indicate whether the CCEs in the last K-1 s-TTI are occupied (or whether the CCEs in the last K-1 s-TTI are not occupied). In some embodiments, the bit field may indicate whether the remaining CCEs in the same s-TTI and the CCEs in the last K-1 s-TTIs are occupied (or whether the remaining CCEs in the same s-TTI and the CCEs in the last K-1 s-TTIs are not occupied). The unoccupied CCEs may be used for s-PDSCH transmissions and an s-UE may bypass s-PDCCH monitoring in the last K-1 s-TTIs.

In some embodiments, a single s-PDCCH may be used to scheduled multiple s-PDSCHs in K (where K>1) s-TTIs. In this embodiment, the bit field includes L bits (e.g., an L bit indicator). In certain embodiments, the K s-TTIs may be divided into L subsets and each bit in the bit field may be used to indicate whether the CCEs in the subset of s-TTIs are occupied (or whether the CCEs in the subset of s-TTIs are not occupied). Such embodiments may use a bit map approach. It should be noted that the first bit in the bit field may be used to indicate whether the remaining CCEs in the s-TTI in which s-PDCCH is transmitted and the CCEs of the remaining s-TTIs in the first subset. In various embodiments, unoccupied CCEs may be used for s-PDSCH transmissions and the s-UE may bypass s-PDCCH monitoring in the s-TTIs where the CCEs are used for s-PDSCH.

In some embodiments, the remaining CCEs in the s-TTI where the s-PDCCH is transmitted in the region of legacy PDCCH may not be used even though the corresponding bit in the bit field indicates the remaining CCEs in the s-TTI where s-PDCCH is transmitted are not occupied.

Figure 6:
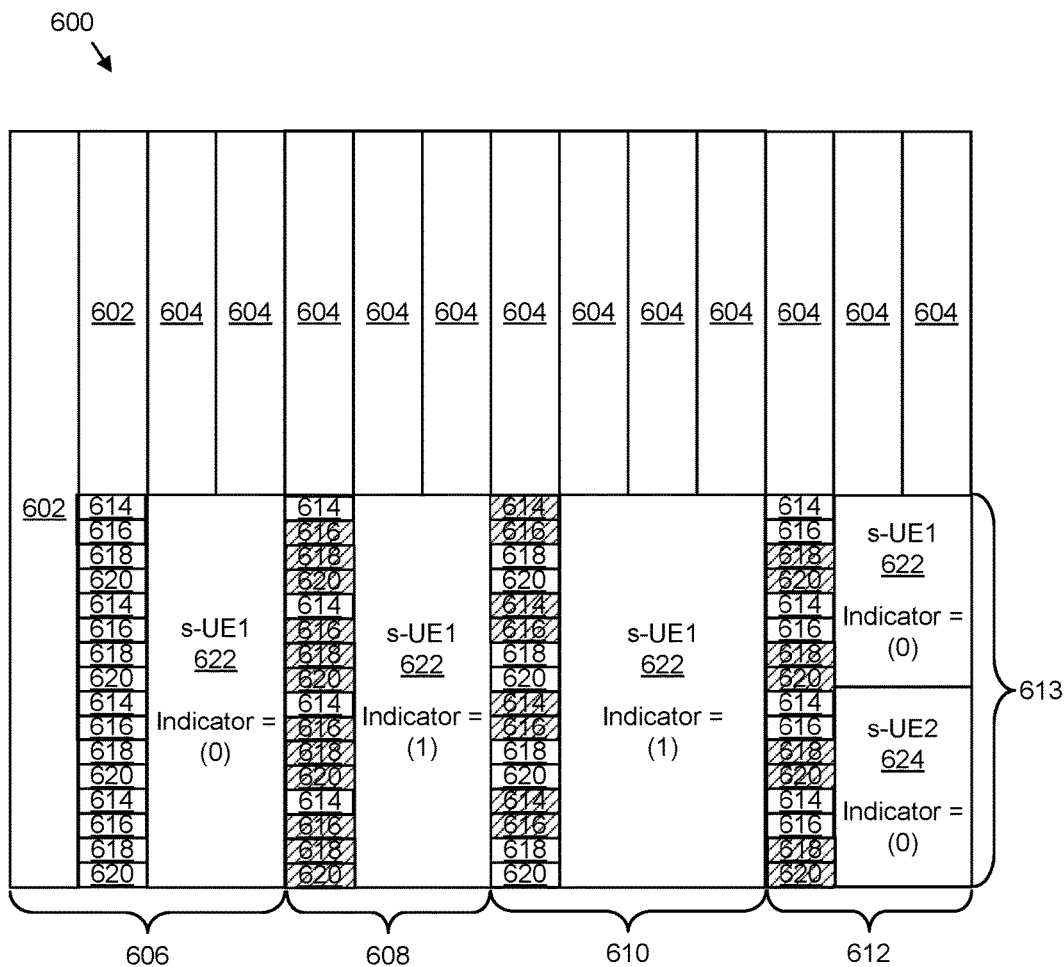
FIG. 6 illustrates one embodiment of communication with efficient RE usage in CCEs.

FIG. 6 illustrates one embodiment of communication 600 with efficient RE usage in CCEs. Specifically, FIG. 6 illustrates one subframe that includes legacy PDCCH 602 and legacy PDSCH 604. Moreover, the subframe of one TTI is divided into multiple s-TTIs. A first s-TTI 606 includes 4 OFDM symbols, a second s-TTI 608 includes 3 OFDM symbols, a third s-TTI 610 includes 4 OFDM symbols, and a fourth s-TTI 612 includes 3 OFDM symbols. The multiple s-TTIs may be configured with a normal CP. Each s-TTI includes a dedicated frequency region 613. Further, within each s-TTI, a control channel frequency region (e.g., s-PDCCH) includes multiple CCEs. Specifically, each s-TTI includes multiple first CCEs 614, second CCEs 616, third CCEs 618, and fourth CCEs 620. CCEs that are unoccupied are illustrated with slashes extending through the CCEs. A data channel frequency region (e.g., s-PDSCH) for one or two s-UEs is scheduled for each s-TTI, such as a data channel frequency region for s-UE1 622 and/or s-UE2 624.

In FIG. 6, one s-PDCCH schedules one s-PDSCH, and the CCE mapping of s-PDCCH is distributed and may be configured by a base station 104. In this embodiment, the total number of CCEs for s-PDCCH, denoted as M, is 4, and the bit field includes a number of bits, denoted as N, which is 1. If an s-UE decodes an s-PDCCH carrying DL assignment that has the bit field set so the indicator (e.g., bit)="0," this means that at least one of the remaining CCEs are occupied by s-PDCCH carrying DL assignment or UL grants for other s-UEs. On the other hand, if an s-UE decodes an s-PDCCH carrying DL assignment with the bit field set so the indicator="1," this means that all of the remaining CCEs within the scheduled data channel (e.g., s-PDSCH) frequency region are unoccupied and can be used for s-PDSCH. The data channel frequency region may be the region illustrated vertically for the s-UE1 622 and the s-UE2 624.

In the first s-TTI 606, the s-PDCCH is transmitted in the legacy PDCCH 602 region and occupies all the four CCEs 614-620. The bit field is set so the indicator="0" because the legacy PDCCH 602 cannot be used for s-PDSCH transmission.

In the second s-TTI 608, only s-UE1 622 is scheduled. In this example only the first CCEs 614 are used to transmit the corresponding s-PDCCH for the s-UE1 622. The second, third, and fourth CCEs 616, 618, and 620 are unoccupied. Therefore, the bit field in the DL DCI is set so the indicator="1," meaning that the second, third, and fourth CCEs 616, 618, and 620 are used for s-PDSCH.

In the third s-TTI 610, only s-UE1 622 is scheduled. However, two s-PDCCHs are transmitted (i.e., one s-PDCCH mapped to the third CCEs 618 is used to schedule an s-PDSCH, and one s-PDCCH mapped to the fourth CCEs 620 is used to schedule an s-PUSCH). In this case, the bit field in the DL DCI is set so the indicator="1," meaning that the first and second CCEs 614 and 616 are used for s-PDSCH.

In the fourth s-TTI 612, there is no restriction on the number of schedulable users; therefore, s-UE1 622 and s-UE2 624 are scheduled. s-PDCCH for s-UE1 622 is mapped to the first CCEs 614 and s-PDCCH for s-UE2 624 is mapped to the second CCEs 616. The upper part of the dedicated frequency region 613 in the fourth s-TTI 612 is assigned to the s-UE1 622 for s-PDSCH transmission and the lower part of the dedicated frequency region 613 in the fourth s-TTI 612 is assigned to the s-UE2 624 for s-PDSCH transmission. In this case, the control channel frequencies of the first CCEs 614 used by the s-UE1 622 overlap with the data channel frequencies of s-PDSCH allocated to the s-UE2 624 and the control channel frequencies of the second CCEs 616 used by the s-UE2 624 overlap with the data channel frequencies of s-PDSCH allocated to the s-UE1 622. Even though the third and fourth CCEs 618 and 620 are unoccupied, the bits of the bit fields in the two DCIs corresponding to the s-UE1 622 and the s-UE2 624 should be set so the indicator="0," meaning that it is not possible to indicate the unoccupied CCEs for either of the s-UE1 622 or the s-UE2 624 because with one bit indication s-UE1 622 cannot know the occupation of the second CCEs 616 and s-UE2 624 cannot know the occupation of the first CCEs 614.

Figure 7:
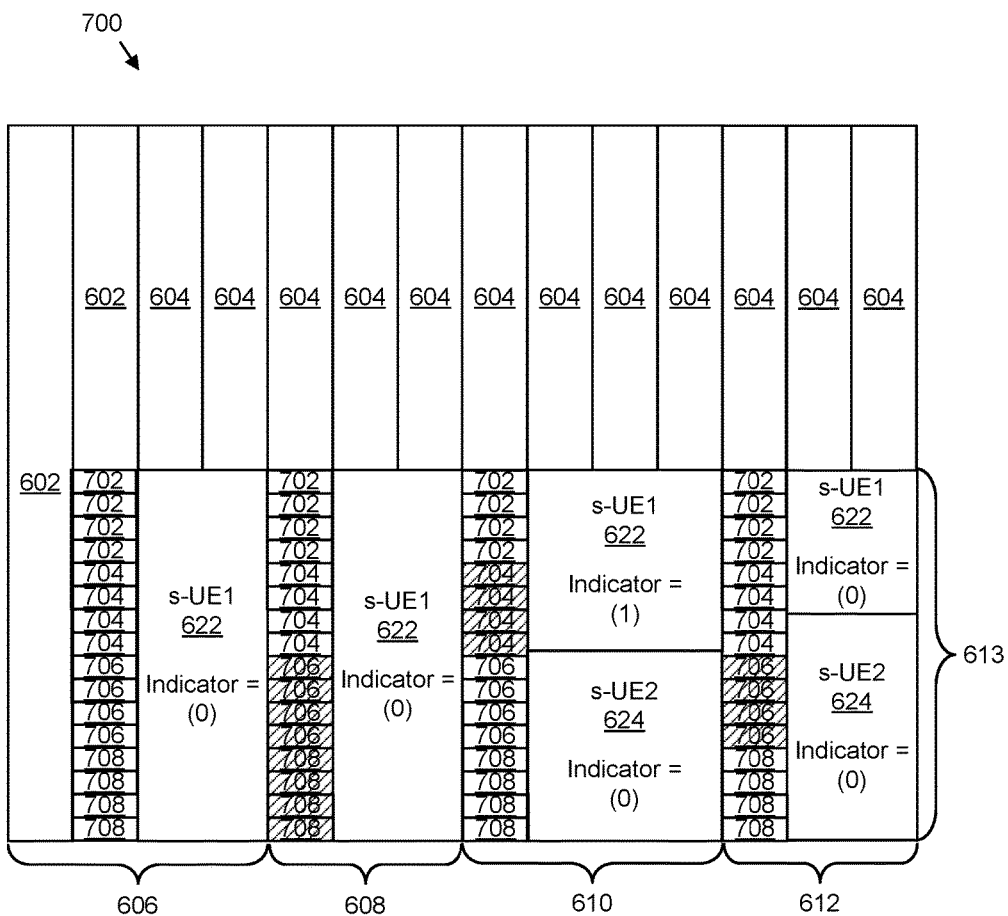
FIG. 7 illustrates another embodiment of communication with efficient RE usage in CCEs.

FIG. 7 illustrates another embodiment of communication 700 with efficient RE usage in CCEs. Specifically, FIG. 7 illustrates one subframe that includes the legacy PDCCH 602 and the legacy PDSCH 604. Moreover, the subframe of one TTI is divided into multiple s-TTIs. The first s-TTI 606 includes 4 OFDM symbols, the second s-TTI 608 includes 3 OFDM symbols, the third s-TTI 610 includes 4 OFDM symbols, and the fourth s-TTI 612 includes 3 OFDM symbols. The multiple s-TTIs may be configured with a normal CP. Each s-TTI includes the dedicated frequency region 613. Further, within each s-TTI, a control channel frequency region (e.g., s-PDCCH) includes multiple CCEs. Specifically, each s-TTI includes first CCEs 702, second CCEs 704, third CCEs 706, and fourth CCEs 708. CCEs that are unoccupied are illustrated with slashes extending through the CCEs. A data channel frequency region (e.g., s-PDSCH) for one or two s-UEs is scheduled for each s-TTI, such as a data channel frequency region for the s-UE1 622 and/or the s-UE2 624.

In FIG. 7, one s-PDCCH schedules one s-PDSCH, and the CCE mapping of s-PDCCH is localized and may be configured by a base station 104. In this embodiment, the total number of CCEs for s-PDCCH, denoted as M, is 4, and the bit field includes a number of bits, denoted as N, which is 1. If an s-UE decodes an s-PDCCH carrying DL assignment that has the bit field set to "0," this means at least one of the remaining CCEs are occupied by s-PDCCH carrying DL assignment or UL grants for other s-UEs. On the other hand, if an s-UE decodes an s-PDCCH carrying DL assignment with the bit field set to "1," this means that all of the remaining CCEs within the scheduled data channel (e.g., s-PDSCH) frequency region are unoccupied and can be used for s-PDSCH. The data channel frequency region may be the region illustrated vertically for the s-UE1 622 and the s-UE2 624.

In the first s-TTI 606, the s-PDCCH is transmitted in the legacy PDCCH 602 region and occupies all the four CCEs 702-708. The bit field is set so the indicator="0" because the legacy PDCCH 602 cannot be used for s-PDSCH transmission.

In the second s-TTI 608, two s-PDCCHs are transmitted (i.e., one s-PDCCH is mapped to the first CCEs 702 and used to schedule an s-PDSCH for the s-UE1 622, and the other s-PDCCH is mapped to the second CCEs 704 and used to schedule an s-PUSCH for s-UE2 624). In this case, the bit field in the DL DCI for the s-UE1 622 is set so the indicator="0," meaning that it is not possible to indicate the unoccupied CCEs (i.e., the third and fourth CCEs 706 and 708) for use by the s-UE1 622 because, with only one bit indication, the s-UE1 622 cannot know the occupation of the second CCEs 704.

In the third s-TTI 610, two s-PDCCHs are transmitted (i.e., one s-PDCCH is mapped to the first CCEs 702 and used to schedule an s-PDSCH for the s-UE1 622, and the other s-PDCCH is mapped to the third and fourth CCEs 706 and 708 and used to schedule an s-PDSCH for the s-UE2 624). In this case, the bit field in the DL DCI for the s-UE1 622 is set so the indicator="1," meaning that that second CCEs 704 are used for s-PDSCH for the s-UE1 622. The s-UE1 622 does not care about the third and fourth CCEs 706 and 708 because they are not in the same frequency region as the s-UE1 622. On the other hand, the bit field in the DL DCI for the s-UE2 624 is set so the indicator="0," meaning that there is no unoccupied CCEs which may be used for s-PDSCH for the s-UE2 624.

In the fourth s-TTI 612, two s-PDCCHs are transmitted (i.e., one s-PDCCH is mapped to the first and second CCEs 702 and 704 and used to schedule an s-PDSCH for the s-UE1 622, and the other s-PDCCH is mapped to the fourth CCEs 708 and used to schedule an s-PDSCH for the s-UE2 624). In this case, the bit field in the DL DCI for the s-UE1 622 is set so the indicator="0," meaning that there is no unoccupied CCEs which can be used for s-PDSCH for s-UE1. On the other hand, the bit field in the DL DCI for s-UE1 624 is set so the indicator="0," meaning that it is not possible to indicate the unoccupied CCEs (i.e., the third CCEs 706) for the s-UE2 624 because with only one bit indication, the s-UE2 624 cannot know the occupation of the second CCEs 704 (e.g., because only part of the frequency range of the second CCEs 704 overlaps with the frequency range of the s-UE2 624).

It should be noted that the bit field in the DL DCI may have a different definition than used in any of FIGS. 6-10. For example, an indication="0" may be used to indicated that at least one of the remaining CCEs, regardless of the scheduled s-PDSCH frequency band, is occupied by other s-UE's s-PDCCH or all CCEs are occupied, and an indication="1" may be used to indicated that all the remaining CCEs are unoccupied. In such an embodiment, this indication may not vary with the scheduled s-PDSCH frequency band. Therefore, it is possible that the values of the bit information in the DL DCI using these two different interpretations may be set differently. One example is that the bit information of the new field in the DL DCI in the third s-TTI 610 may be set with the indication="0" but not "1" for the s-UE1 622.

Figure 8:
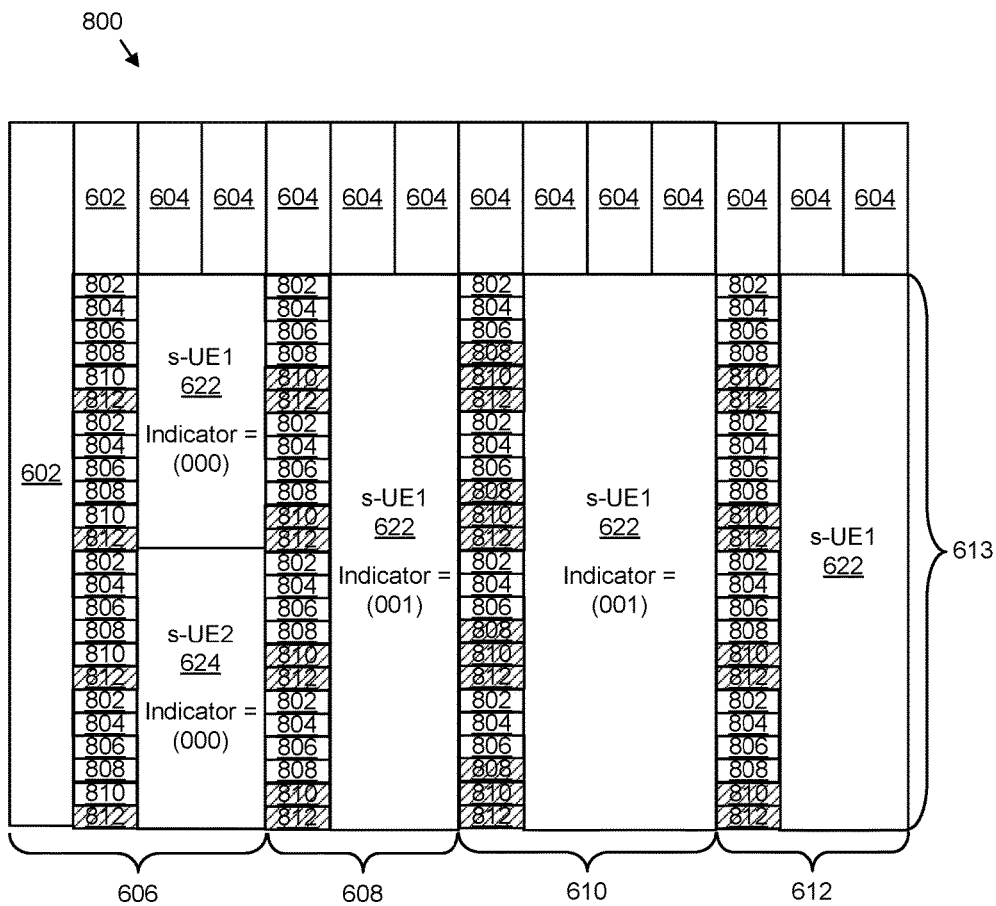
FIG. 8 illustrates a further embodiment of communication with efficient RE usage in CCEs.

FIG. 8 illustrates a further embodiment of communication 800 with efficient RE usage in CCEs. Specifically, FIG. 8 illustrates one subframe that includes the legacy PDCCH 602 and the legacy PDSCH 604. Moreover, the subframe of one TTI is divided into multiple s-TTIs. The first s-TTI 606 includes 4 OFDM symbols, the second s-TTI 608 includes 3 OFDM symbols, the third s-TTI 610 includes 4 OFDM symbols, and the fourth s-TTI 612 includes 3 OFDM symbols. The multiple s-TTIs may be configured with a normal CP. Each s-TTI includes the dedicated frequency region 613. Further, within each s-TTI, a control channel frequency region (e.g., s-PDCCH) includes multiple CCEs. Specifically, each s-TTI includes first CCEs 802, second CCEs 804, third CCEs 806, fourth CCEs 808, fifth CCEs 810, and sixth CCEs 812. CCEs that are unoccupied are illustrated with slashes extending through the CCEs. A data channel frequency region (e.g., s-PDSCH) for one or two s-UEs is scheduled for each s-TTI, such as a data channel frequency region for the s-UE1 622 and/or the s-UE2 624.

In FIG. 8, s-PDCCH may schedule one or more s-PDSCH, and the CCE mapping of s-PDCCH is distributed and may be configured by a base station 104. In this embodiment, the total number of CCEs for s-PDCCH, denoted as M, is 6, and the bit field includes a number of bits, denoted as N, which is 3. The 6 CCEs are divided into 3 sets which are set1 ({the first CCEs 802, the second CCEs 804}), set2 ({the third CCEs 806, the fourth CCEs 808}), and set3 ({the fifth CCEs 810, the sixth CCEs 812}), and each bit in the 3-bit field indicates whether the corresponding set (i.e., set1, set2, set3) of s-PDCCH CCEs are occupied or not. This means the corresponding bit in the bit field should be set to "0" if at least one of CCEs in the set are occupied or be set to "1" if both CCEs in the set are not occupied.

In the first s-TTI 606, the s-PDCCH is transmitted in the legacy PDCCH 602 region. The bit field is set so the indicator="000" because the legacy PDCCH 602 region cannot be used for s-PDSCH transmission if backward compatibility is maintained.

In the second s-TTI 608, only one s-UE is scheduled. In this example, the first CCEs 802, the second CCEs 804, the third CCEs 806, and the fourth CCEs 808 are used to transmit the corresponding s-PDCCH. The fifth CCEs 810 and the sixth CCEs 812 are unoccupied. Therefore, the bit field in the DL DCI is set so the indicator="001," meaning that the fifth CCEs 810 and the sixth CCEs 812 are used for s-PDSCH.

In the third s-TTI 610, an s-PDCCH which occupies the first CCEs 802, the second CCEs 804, and the third CCEs 806 schedules two s-PDSCHs for the s-UEs in two s-TTIs (i.e., the third and fourth s-TTIs 610 and 612). In this case, the bit field in the DL DCI for the s-UE1 622 is set so the indicator="001," meaning that set3({the fifth CCEs 810, the sixth CCEs 812}) within the s-PDSCH frequency band in the third s-TTI 610 and the fourth s-TTI 612 for the s-UE1 622 are used for s-PDSCH of the s-UE1 622 in the third s-TTI 610 and the fourth s-TTI 612.

Figure 9:
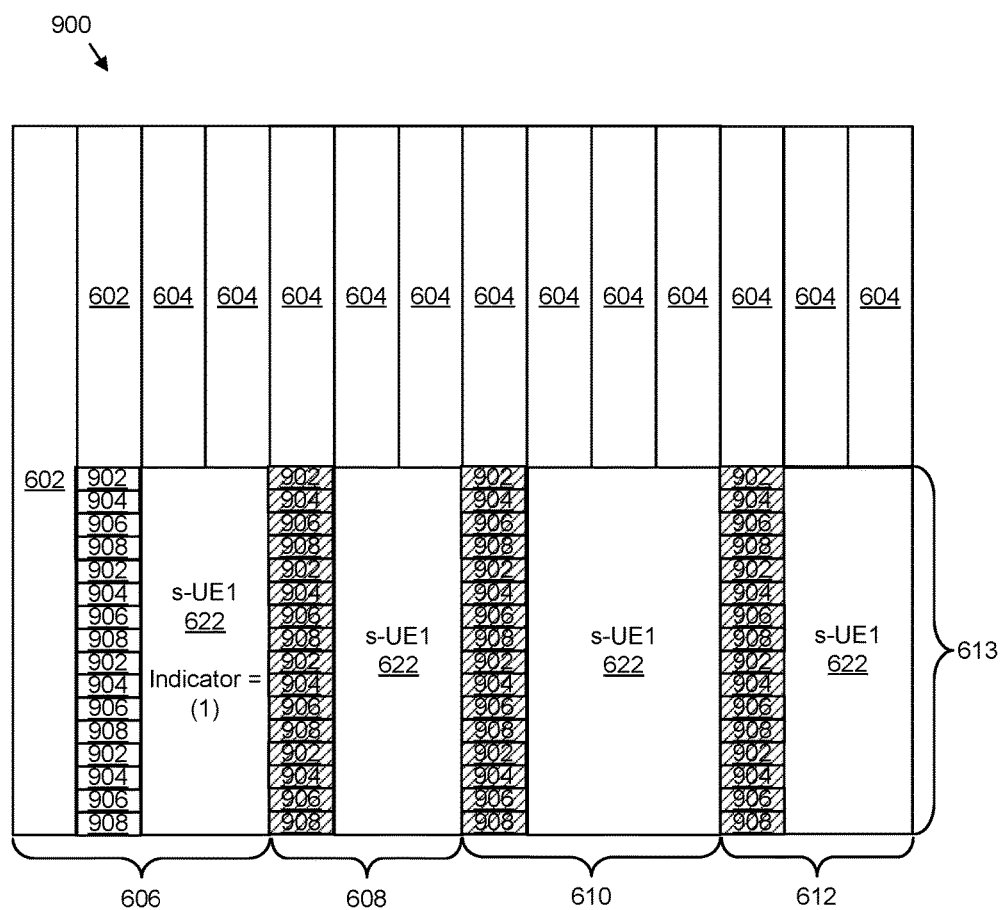
FIG. 9 illustrates yet another embodiment of communication with efficient RE usage in CCEs.

FIG. 9 illustrates yet another embodiment of communication 900 with efficient RE usage in CCEs. Specifically, FIG. 9 illustrates one subframe that includes the legacy PDCCH 602 and the legacy PDSCH 604. Moreover, the subframe of one TTI is divided into multiple s-TTIs. The first s-TTI 606 includes 4 OFDM symbols, the second s-TTI 608 includes 3 OFDM symbols, the third s-TTI 610 includes 4 OFDM symbols, and the fourth s-TTI 612 includes 3 OFDM symbols. The multiple s-TTIs may be configured with a normal CP. Each s-TTI includes the dedicated frequency region 613. Further, within each s-TTI, a control channel frequency region (e.g., s-PDCCH) includes multiple CCEs. Specifically, each s-TTI includes first CCEs 902, second CCEs 904, third CCEs 906, and fourth CCEs 908. CCEs that are unoccupied are illustrated with slashes extending through the CCEs. A data channel frequency region (e.g., s-PDSCH) for one or two s-UEs is scheduled for each s-TTI, such as a data channel frequency region for the s-UE1 622 and/or the s-UE2 624.

In FIG. 9, an s-PDCCH may schedule multiple s-PDSCHs, and the CCE mapping of s-PDCCH is distributed and may be configured by a base station 104. In this embodiment, the total number of CCEs for s-PDCCH, denoted as M, is 4, and the bit field includes a number of bits, denoted as N, which is 1.

The s-PDCCH in the first s-TTI 606 schedules s-PDSCH for the s-UE1 622 in the first s-TTI 606, the second s-TTI 608, the third s-TTI 610, and the fourth s-TTI 612. If the bit field is set so the indicator="1," this means the remaining CCEs except the CCEs occupied by the s-PDCCH in the first s-TTI 606 and all the s-PDCCH CCEs in the second s-TTI 608, the third s-TTI 610, and the fourth s-TTI 612 may be used for s-PDSCH. If the bit field is set so the indicator="0," this means the remaining CCEs except the CCEs occupied by the s-PDCCH in the first s-TTI 606 and all the s-PDCCH CCEs in the second s-TTI 608, the third s-TTI 610, and the fourth s-TTI 612 are reserved for s-PDCCH transmission. As shown in FIG. 9, the bit field is set so the indicator="1," so all the s-PDCCH CCEs in the second s-TTI 608, the third s-TTI 610, and the fourth s-TTI 612 are reserved for s-PDCCH transmission, while the s-PDSCH can't use the REs in the legacy PDCCH 602 because the s-PDCCH of the first s-TTI 606 is transmitted in the region of legacy PDCCH 602.

Figure 10:
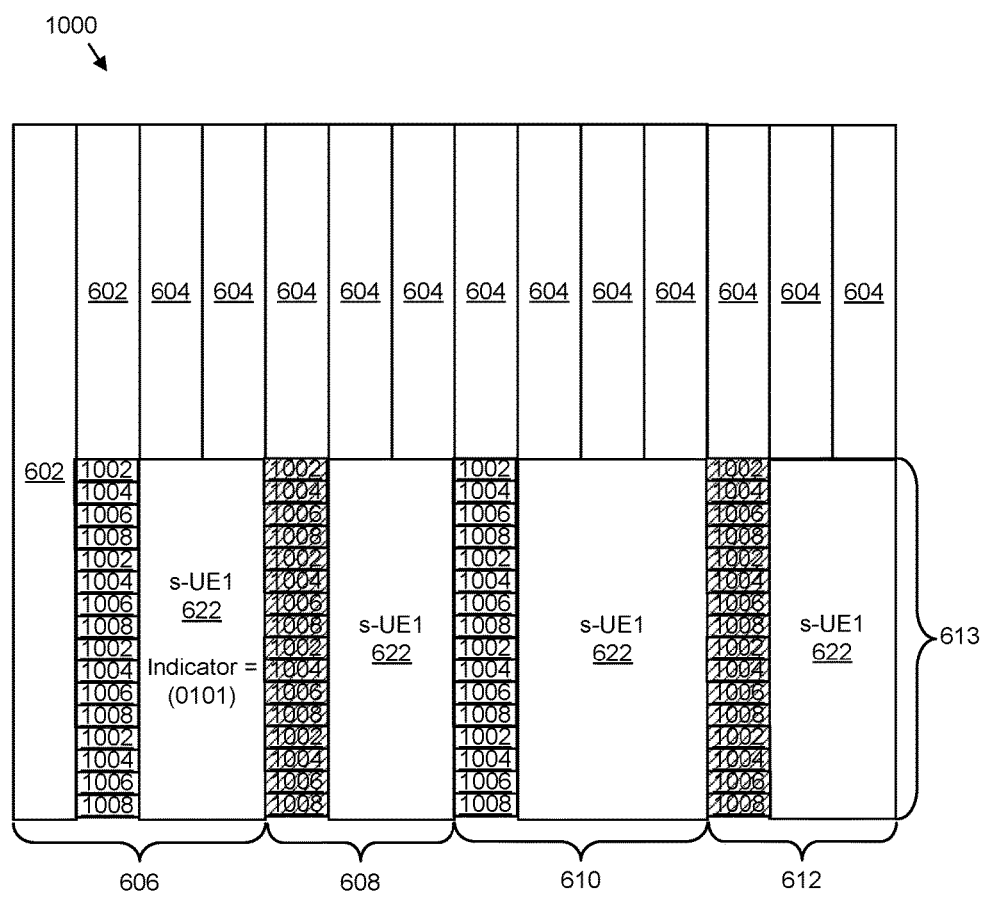
FIG. 10 illustrates an additional embodiment of communication with efficient RE usage in CCEs.

FIG. 10 illustrates an additional embodiment of communication 1000 with efficient RE usage in CCEs. Specifically, FIG. 10 illustrates one subframe that includes the legacy PDCCH 602 and the legacy PDSCH 604. Moreover, the subframe of one TTI is divided into multiple s-TTIs. The first s-TTI 606 includes 4 OFDM symbols, the second s-TTI 608 includes 3 OFDM symbols, the third s-TTI 610 includes 4 OFDM symbols, and the fourth s-TTI 612 includes 3 OFDM symbols. The multiple s-TTIs may be configured with a normal CP. Each s-TTI includes the dedicated frequency region 613. Further, within each s-TTI, a control channel frequency region (e.g., s-PDCCH) includes multiple CCEs. Specifically, each s-TTI includes first CCEs 1002, second CCEs 1004, third CCEs 1006, and fourth CCEs 1008. CCEs that are unoccupied are illustrated with slashes extending through the CCEs. A data channel frequency region (e.g., s-PDSCH) for one or two s-UEs is scheduled for each s-TTI, such as a data channel frequency region for the s-UE1 622 and/or the s-UE2 624.

In FIG. 10, an s-PDCCH may schedule multiple s-PDSCHs, and the CCE mapping of s-PDCCH is distributed and may be configured by a base station 104. In this embodiment, the total number of CCEs for s-PDCCH, denoted as M, is 4, the number of multi-TTI scheduling for s-PDSCH, denoted as K, is 4, and the bit field includes a number of bits, denoted as L, which is 4.

The s-PDCCH in the first s-TTI 606 schedules K s-PDSCH for the s-UE1 622 in the first s-TTI 606, the second s-TTI 608, the third s-TTI 610, and the fourth s-TTI 612. Because the number of bits in the bit field is equal to the number of scheduled s-TTIs, then each subset of s-TTI contains one s-TTI; however, in other embodiments, one bit may correspond to more than one s-TTI. The bit field is used to indicate whether the remaining CCEs in the first subset of s-TTIs are occupied or not and whether CCEs in the other 3 subsets are occupied or not. As shown in FIG. 10, if the bit field is set so the indicator="0101," this means the remaining CCEs expect the CCEs occupied by the s-UE1's 622 s-PDCCH are reserved in the first s-TTI 606, and the CCEs in third s-TTI 610 are reserved for s-PDCCH in which case the REs in which these CCEs are mapped can't be used for s-PDSCH transmission of the s-UE1 622, while the CCEs in the second s-TTI 608 and the fourth s-TTI 612 are not occupied and may be used for s-PDSCH transmission of the s-UE1 622.

Figure 11:
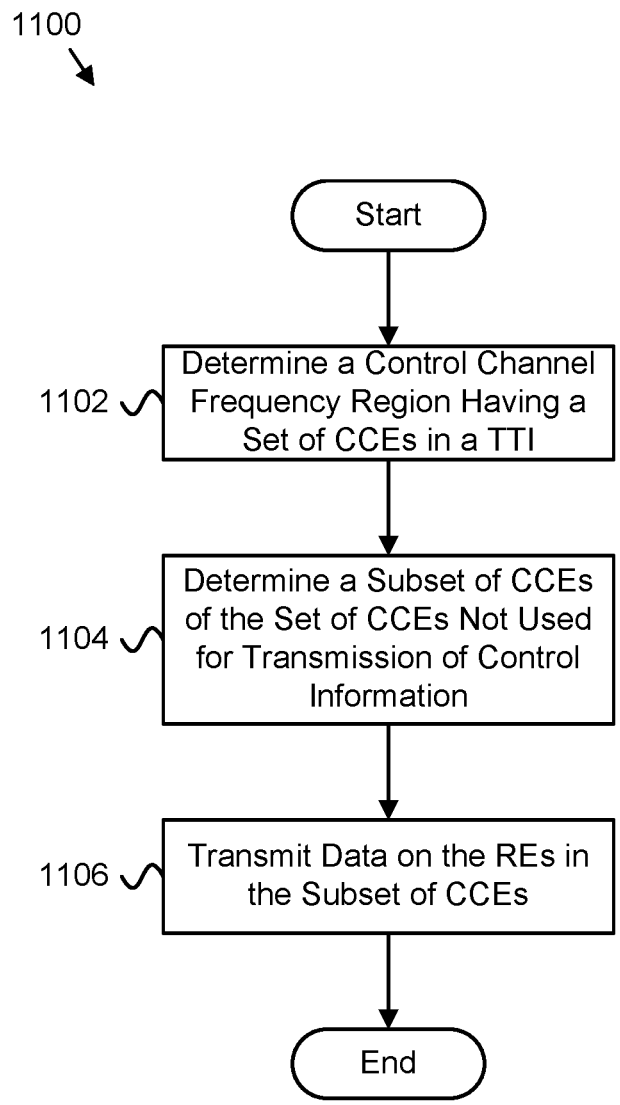
FIG. 11 is a schematic flow chart diagram illustrating one embodiment of a method for transmitting data on REs of CCEs.

FIG. 11 is a schematic flow chart diagram illustrating one embodiment of a method 1100 for transmitting data on REs of CCEs. In some embodiments, the method 1100 is performed by an apparatus, such as the base unit 104. In certain embodiments, the method 1100 may be performed by a processor executing program code, for example, a microcontroller, a microprocessor, a CPU, a GPU, an auxiliary processing unit, a FPGA, or the like.

The method 1100 may include determining 1102 a control channel frequency region including a set of CCEs in a TTI. Each CCE of the set of CCEs includes a set of REs. The method 1100 may also include determining 1104 a subset of CCEs of the set of CCEs not used for transmission of control information. The method 1100 may include transmitting 1106 data on the REs in the subset of CCEs.

In certain embodiments, the method 1100 includes transmitting control information indicating a data channel frequency region using CCEs in the set of CCEs. In some embodiments, the method 1100 includes transmitting a control channel occupancy indicator that indicates the subset of CCEs not used for transmission of control information. In one embodiment, the control channel occupancy indicator includes a one-bit indicator that indicates the subset of CCEs includes each CCE of the set of CCEs in which control information is not detected. In various embodiments, the subset of CCEs excludes CCEs outside of a data channel frequency region.

In some embodiments, the control channel occupancy indicator includes an N-bit indicator, and each bit of the N-bit indicator indicates whether a corresponding subset of CCEs of the set of CCEs is used for transmission of control information. In certain embodiments, the control channel occupancy indicator includes a one-bit indicator that indicates a second set of CCEs in the control channel frequency region not used for transmission of control information. The second set of CCEs may be in one or more TTIs that follow the TTI. In various embodiments, the control channel occupancy indicator includes an L-bit indicator, and each bit of the L-bit indicator indicates whether a corresponding set of CCEs in a set of K TTIs is used for transmission of control information. In some embodiments, the control channel occupancy indicator excludes CCEs of the set of CCEs on which control information is transmitted.

Figure 12:
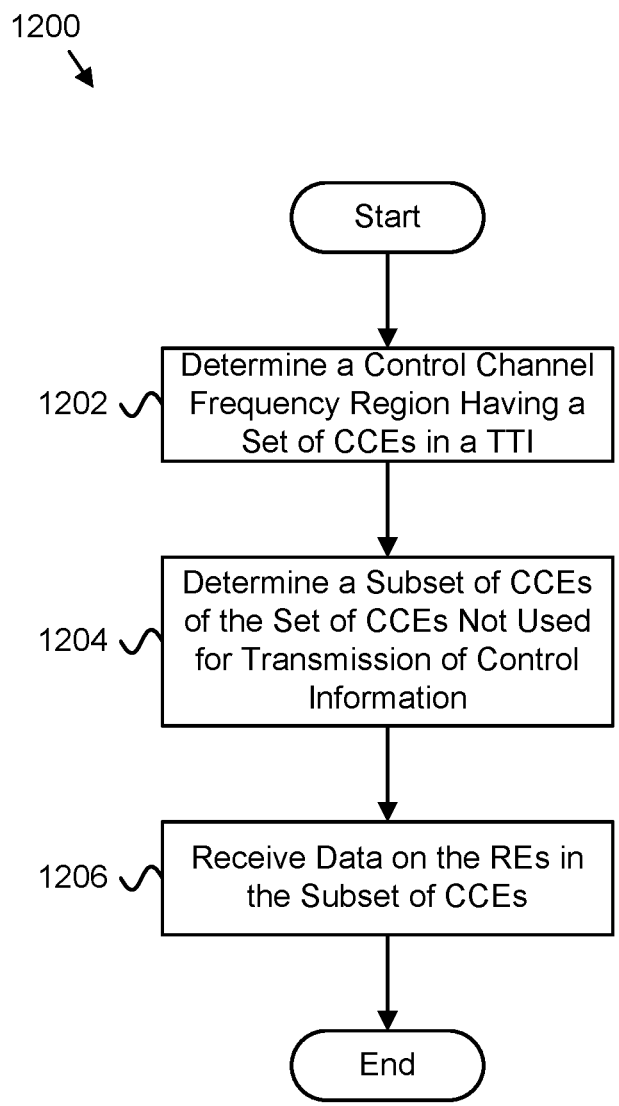
FIG. 12 is a schematic flow chart diagram illustrating one embodiment of a method for receiving data on REs of CCEs.

FIG. 12 is a schematic flow chart diagram illustrating one embodiment of a method 1200 for receiving data on REs of CCEs. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include determining 1202 a control channel frequency region including a set of CCEs in a TTI. Each CCE of the set of CCEs includes a set of REs. The method 1200 may also include determining 1204 a subset of CCEs of the set of CCEs not used for transmission of control information. The method 1200 may include receiving 1206 data on the REs in the subset of CCEs.

In certain embodiments, the method 1200 includes receiving control information indicating a data channel frequency region using CCEs in the set of CCEs. In some embodiments, the method 1200 includes receiving a control channel occupancy indicator that indicates the subset of CCEs not used for transmission of control information. In one embodiment, the control channel occupancy indicator includes a one-bit indicator that indicates the subset of CCEs includes each CCE of the set of CCEs in which control information is not detected. In various embodiments, the subset of CCEs excludes CCEs outside of a data channel frequency region.

In some embodiments, the control channel occupancy indicator includes an N-bit indicator, and each bit of the N-bit indicator indicates whether a corresponding subset of CCEs of the set of CCEs is used for transmission of control information. In certain embodiments, the control channel occupancy indicator includes a one-bit indicator that indicates a second set of CCEs in the control channel frequency region not used for transmission of control information. The second set of CCEs may be in one or more TTIs that follow the TTI. In various embodiments, the control channel occupancy indicator includes an L-bit indicator, and each bit of the L-bit indicator indicates whether a corresponding set of CCEs in a set of K TTIs is used for transmission of control information. In some embodiments, the control channel occupancy indicator excludes CCEs of the set of CCEs on which control information is transmitted.

Although specific embodiments have been described herein, other embodiments may include any combination of the elements of the embodiments described. For example, a control channel occupancy indicator may be a one-bit indicator, an N-bit indicator, or an L-bit indicator. Either one of the one-bit indicator, the N-bit indicator, or the L-bit indicator may indicate the subset of CCEs not used for transmission of control information, indicate the subset of CCEs includes each CCE of a set of CCEs in which control information is not transmitted or detected, indicate the subset of CCEs in which the subset of CCEs excludes CCEs outside of a data channel frequency region, indicate a set of TTIs corresponding to each bit, exclude CCEs of a set of CCEs on which control information is transmitted, and/or indicate a second set of CCEs in a control channel frequency region not used for transmission of control information, wherein the second set of CCEs are in one or more TTIs that follow the TTI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor that:
   determines a control channel frequency region comprising a set of control channel elements ("CCEs") in a transmit time interval ("TTI"), wherein each CCE of the set of CCEs comprises a set of resource elements ("REs"); and
   determines a subset of CCEs of the set of CCEs not used for transmission of control information; and
   a transmitter that:
   transmits a control channel occupancy indicator that indicates the subset of CCEs; and
   transmits data on the REs in the subset of CCEs.

2. The apparatus of claim 1, wherein the transmitter transmits control information indicating a data channel frequency region using CCEs in the set of CCEs.

3. The apparatus of claim 1, wherein the control channel occupancy indicator comprises a one-bit indicator that indicates the subset of CCEs comprises each CCE of the set of CCEs in which control information is not transmitted.

4. The apparatus of claim 3, wherein the subset of CCEs excludes CCEs outside of a data channel frequency region.

5. The apparatus of claim 1, wherein the control channel occupancy indicator comprises an N-bit indicator, and each bit of the N-bit indicator indicates whether a corresponding subset of CCEs of the set of CCEs is used for transmission of control information.

6. The apparatus of claim 1, wherein the control channel occupancy indicator comprises a one-bit indicator that indicates a second set of CCEs in the control channel frequency region not used for transmission of control information, wherein the second set of CCEs are in one or more TTIs that follow the TTI.

7. The apparatus of claim 1, wherein the control channel occupancy indicator comprises an L-bit indicator, and each bit of the L-bit indicator indicates whether a corresponding set of CCEs in a set of K TTIs is used for transmission of control information.

8. The apparatus of claim 1, wherein the control channel occupancy indicator excludes CCEs of the set of CCEs on which control information is transmitted.

9. A method comprising:
   determining a control channel frequency region comprising a set of control channel elements ("CCEs") in a transmit time interval ("TTI"), wherein each CCE of the set of CCEs comprises a set of resource elements ("REs");
   determining a subset of CCEs of the set of CCEs not used for transmission of control information;
   transmitting a control channel occupancy indicator that indicates the subset of CCEs; and
   transmitting data on the REs in the subset of CCEs.

10. The method of claim 9, further comprising transmitting control information indicating a data channel frequency region using CCEs in the set of CCEs.

11. The method of claim 9, wherein the control channel occupancy indicator comprises a one-bit indicator that indicates the subset of CCEs comprises each CCE of the set of CCEs in which control information is not transmitted.

12. The method of claim 11, wherein the subset of CCEs excludes CCEs outside of a data channel frequency region.

13. The method of claim 9, wherein the control channel occupancy indicator comprises an N-bit indicator, and each bit of the N-bit indicator indicates whether a corresponding subset of CCEs of the set of CCEs is used for transmission of control information.

14. The method of claim 9, wherein the control channel occupancy indicator comprises a one-bit indicator that indicates a second set of CCEs in the control channel frequency region not used for transmission of control information, wherein the second set of CCEs are in one or more TTIs that follow the TTI.

15. The method of claim 9, wherein the control channel occupancy indicator comprises an L-bit indicator, and each bit of the L-bit indicator indicates whether a corresponding set of CCEs in a set of K TTIs is used for transmission of control information.

16. The method of claim 9, wherein the control channel occupancy indicator excludes CCEs of the set of CCEs on which control information is transmitted.

17. An apparatus comprising:
   a processor that determines a control channel frequency region comprising a set of control channel elements ("CCEs") in a transmit time interval ("TTI"), wherein each CCE of the set of CCEs comprises a set of resource elements ("REs"); and
   a receiver that:
   receives a control channel occupancy indicator that indicates a subset of CCEs of the set of CCEs not used for transmission of control information; and
   receives data on the REs in the subset of CCEs.

18. The apparatus of claim 17, wherein the receiver receives control information indicating a data channel frequency region using CCEs in the set of CCEs.

19. The apparatus of claim 17, wherein the control channel occupancy indicator comprises a one-bit indicator that indicates the subset of CCEs comprises each CCE of the set of CCEs in which control information is not detected.

20. The apparatus of claim 19, wherein the subset of CCEs excludes CCEs outside of a data channel frequency region.

21. The apparatus of claim 17, wherein the control channel occupancy indicator comprises an N-bit indicator, and each bit of the N-bit indicator indicates whether a corresponding subset of CCEs of the set of CCEs is used for transmission of control information.

22. The apparatus of claim 17, wherein the control channel occupancy indicator comprises a one-bit indicator that indicates a second set of CCEs in the control channel frequency region not used for transmission of control information, wherein the second set of CCEs are in one or more TTIs that follow the TTI.

23. The apparatus of claim 17, wherein the control channel occupancy indicator comprises an L-bit indicator, and each bit of the L-bit indicator indicates whether a corresponding set of CCEs in a set of K TTIs is used for transmission of control information.

24. The apparatus of claim 17, wherein the control channel occupancy indicator excludes CCEs of the set of CCEs on which control information is detected.

25. A method comprising:
determining a control channel frequency region comprising a set of control channel elements ("CCEs") in a transmit time interval ("TTI"), wherein each CCE of the set of CCEs comprises a set of resource elements ("REs");
receiving a control channel occupancy indicator that indicates a subset of CCEs of the set of CCEs not used for transmission of control information; and
receiving data on the REs in the subset of CCEs.

26. The method of claim 25, further comprising receiving control information indicating a data channel frequency region using CCEs in the set of CCEs.

27. The method of claim 25, wherein the control channel occupancy indicator comprises a one-bit indicator that indicates the subset of CCEs comprises each CCE of the set of CCEs in which control information is not detected.

28. The method of claim 27, wherein the subset of CCEs excludes CCEs outside of a data channel frequency region.

29. The method of claim 25, wherein the control channel occupancy indicator comprises an N-bit indicator, and each bit of the N-bit indicator indicates whether a corresponding subset of CCEs of the set of CCEs is used for transmission of control information.

30. The method of claim 25, wherein the control channel occupancy indicator comprises a one-bit indicator that indicates a second set of CCEs in the control channel frequency region not used for transmission of control information, wherein the second set of CCEs are in one or more TTIs that follow the TTI.

31. The method of claim 25, wherein the control channel occupancy indicator comprises an L-bit indicator, and each bit of the L-bit indicator indicates whether a corresponding set of CCEs in a set of K TTIs is used for transmission of control information.

32. The method of claim 25, wherein the control channel occupancy indicator excludes CCEs of the set of CCEs on which control information is detected.

* * * * *